United States Patent
Tuttle (10) Patent No.: US 7,158,031 B2
(45) Date of Patent: Jan. 2, 2007

(54) THIN, FLEXIBLE, RFID LABEL AND SYSTEM FOR USE

(75) Inventor: John R. Tuttle, Corrales, NM (US)

(73) Assignee: Micron Technology, Inc., Boise, ID (US)

(*) Notice: Subject to any disclaimer, the term of this patent is extended or adjusted under 35 U.S.C. 154(b) by 85 days.

(21) Appl. No.: 10/705,685

(22) Filed: Nov. 10, 2003

(65) Prior Publication Data

US 2004/0246099 A1   Dec. 9, 2004

Related U.S. Application Data

(60) Continuation of application No. 09/481,807, filed on Jan. 11, 2000, now Pat. No. 6,741,178, which is a division of application No. 08/934,701, filed on Sep. 22, 1997, now Pat. No. 6,013,949, which is a continuation of application No. 08/610,236, filed on Mar. 4, 1996, now abandoned, which is a continuation of application No. 08/168,909, filed on Dec. 17, 1993, now Pat. No. 5,497,140, which is a continuation of application No. 07/928,899, filed on Aug. 12, 1992, now abandoned.

(51) Int. Cl.
*G08B 13/14* (2006.01)

(52) U.S. Cl. ............... 340/572.1; 340/572.4; 340/572.8; 340/573.1; 340/825.3; 340/870.16; 342/44; 342/50

(58) Field of Classification Search ............ 340/572.1, 340/573.1, 539.12, 825.3, 870.16, 572.8, 340/572.4; 342/44, 50
See application file for complete search history.

(56) References Cited

U.S. PATENT DOCUMENTS

| | | | |
|---|---|---|---|
| 3,701,317 A | 10/1972 | Miyamoto et al. | 101/170 |
| 3,706,094 A | 12/1972 | Cole et al. | 342/44 |
| 3,750,167 A | 7/1973 | Gehman et al. | 342/44 |
| 3,780,368 A | 12/1973 | Northeved et al. | 342/44 |
| 3,832,530 A | 8/1974 | Reitbock et al. | 342/44 |
| 3,849,633 A | 11/1974 | Reitbock et al. | 235/487 |
| 3,981,761 A | 9/1976 | Kojima et al. | 156/235 |
| 4,049,969 A | 9/1977 | Salonimer et al. | 356/5 |
| 4,075,632 A | 2/1978 | Baldwin et al. | 343/68 R |
| 4,135,184 A | 1/1979 | Pruzick | 340/572 |
| 4,232,512 A | 11/1980 | Yoshikawa et al. | 368/82 |
| 4,331,957 A | 5/1982 | Enander et al. | 342/22 |
| 4,399,441 A | 8/1983 | Vaughan et al. | 342/50 |
| 4,412,356 A | 10/1983 | Klaus et al. | 455/603 |
| 4,413,254 A | 11/1983 | Pinneo et al. | 340/572 |
| 4,418,411 A | 11/1983 | Streitzel | 340/870.16 |
| 4,484,355 A | 11/1984 | Henke et al. | 455/76 |
| 4,506,148 A | 3/1985 | Berthold et al. | 235/380 |

(Continued)

FOREIGN PATENT DOCUMENTS

DE    38 24 870 A1    4/1989

(Continued)

OTHER PUBLICATIONS

Casson, K., et al., "High Temperature Packaging: Flip Chip on Flexible Laminate", *Surface Mount Technology*, pp. 19-20 (Jan. 1992).

(Continued)

*Primary Examiner*—Tai Nguyen
(74) *Attorney, Agent, or Firm*—Wells St. John P.S.

(57) ABSTRACT

A radio frequency indentification (RFID) label includes an integrated circuit and an antenna. The label may also include two flexible films directly sealed to each other. The label may be affixed to an article and used in conjunction with an interrogation system to track the article.

75 Claims, 6 Drawing Sheets

U.S. PATENT DOCUMENTS

| | | | |
|---|---|---|---|
| 4,539,472 A | 9/1985 | Poetker et al. | 235/488 |
| 4,724,427 A | 2/1988 | Carroll | 340/572 |
| 4,727,560 A | 2/1988 | Van Zanten et al. | 377/60 |
| 4,742,340 A | 5/1988 | Nowik et al. | 340/572 |
| 4,746,618 A | 5/1988 | Nath et al. | 437/2 |
| 4,746,830 A | 5/1988 | Holland | 310/313 |
| 4,756,717 A | 7/1988 | Sturgis et al. | 427/290 |
| 4,777,563 A | 10/1988 | Teraoka et al. | 361/395 |
| 4,783,646 A | 11/1988 | Matsuzaki | 340/572 |
| 4,827,110 A | 5/1989 | Rossi et al. | 235/376 |
| 4,827,395 A | 5/1989 | Anders et al. | 364/138 |
| 4,854,328 A | 8/1989 | Pollack | 128/736 |
| 4,857,893 A * | 8/1989 | Carroll | 340/572.7 |
| 4,911,217 A | 3/1990 | Dunn et al. | 152/152.1 |
| 4,918,631 A | 4/1990 | Hara et al. | 364/708 |
| 4,926,182 A | 5/1990 | Ohta et al. | 342/44 |
| 4,942,327 A | 7/1990 | Watanabe et al. | 310/313 R |
| 4,960,983 A | 10/1990 | Inoue | 235/449 |
| 4,962,415 A | 10/1990 | Yamamoto et al. | 357/74 |
| 5,008,776 A | 4/1991 | Queyssac | 361/392 |
| 5,023,573 A | 6/1991 | Adam | 333/17.2 |
| 5,055,968 A | 10/1991 | Nishi et al. | 361/395 |
| 5,095,240 A | 3/1992 | Nysen et al. | 310/313 |
| 5,124,782 A | 6/1992 | Hundt et al. | 257/724 |
| 5,134,277 A | 7/1992 | Yerbury et al. | 250/214 |
| 5,144,314 A | 9/1992 | Malmberg et al. | 342/44 |
| 5,148,355 A | 9/1992 | Lowe et al. | 361/410 |
| 5,148,504 A | 9/1992 | Levi et al. | 385/14 |
| 5,153,710 A | 10/1992 | McCain | 357/75 |
| 5,164,732 A | 11/1992 | Brockelsby et al. | 342/44 |
| 5,166,502 A | 11/1992 | Rendleman et al. | 235/492 |
| 5,175,418 A | 12/1992 | Tanaka | 235/439 |
| 5,214,410 A | 5/1993 | Verster | 340/572 |
| 5,266,925 A | 11/1993 | Vercellotti et al. | 340/572 |
| 5,274,221 A | 12/1993 | Matsubara | 235/492 |
| 5,302,954 A | 4/1994 | Brooks et al. | 342/44 |
| 5,313,211 A | 5/1994 | Tokuda et al. | 340/50 |
| 5,317,309 A | 5/1994 | Vercellotti et al. | 340/825 |
| 5,337,063 A | 8/1994 | Takahira | 343/741 |
| 5,340,968 A | 8/1994 | Watanabe et al. | 235/380 |
| 5,347,263 A | 9/1994 | Carroll et al. | 340/825 |
| 5,402,095 A | 3/1995 | Janniere | 235/441 |
| 5,412,192 A | 5/1995 | Hoss | 235/380 |
| 5,414,427 A | 5/1995 | Gunnarsson | 342/825 |
| 5,428,214 A | 6/1995 | Hakkers et al. | 235/492 |
| 5,448,110 A | 9/1995 | Tuttle et al. | 257/723 |
| 5,497,140 A | 3/1996 | Tuttle | 342/51 |
| 5,528,222 A | 6/1996 | Moskowitz et al. | 340/572 |
| 5,566,441 A | 10/1996 | Marsh et al. | 29/600 |
| 5,572,226 A | 11/1996 | Tuttle | 434/726 |
| 5,598,032 A | 1/1997 | Fidalgo | 257/679 |
| 5,600,175 A | 2/1997 | Orthmann | 257/532 |
| 5,621,412 A | 4/1997 | Sharpe et al. | 342/51 |
| 5,647,122 A | 7/1997 | Launay et al. | 29/840 |
| 5,649,296 A | 7/1997 | MacLellan et al. | 455/38.2 |
| 5,719,586 A | 2/1998 | Tuttle | 343/726 |
| 5,729,053 A | 3/1998 | Orthmann | 257/724 |
| 5,735,040 A | 4/1998 | Ochi et al. | 29/841 |
| 5,776,278 A | 7/1998 | Tuttle et al. | 156/213 |
| 5,779,839 A | 7/1998 | Tuttle et al. | 156/213 |
| 5,850,690 A | 12/1998 | Launay et al. | 29/841 |
| 5,880,934 A | 3/1999 | Haghiri-Tehrani | 361/737 |
| 5,880,937 A | 3/1999 | Schadhauser et al. | 361/794 |
| 5,955,949 A | 9/1999 | Cocita | 340/572 |
| 5,982,284 A | 11/1999 | Baldwin et al. | 340/572 |
| 6,036,099 A | 3/2000 | Leighton | 235/488 |
| 6,130,602 A | 10/2000 | O'Toole et al. | 340/10.33 |
| 6,265,977 B1 | 7/2001 | Vega et al. | 340/572 |
| 6,294,998 B1 | 9/2001 | Adams et al. | 340/572 |
| 6,514,367 B1 | 2/2003 | Leighton | 156/153 |

FOREIGN PATENT DOCUMENTS

| | | |
|---|---|---|
| DE | 41 20 265 A1 | 6/1991 |
| DE | 3201065 | 7/1993 |
| DE | 4431605 | 3/1996 |
| EP | 0 595 549 A2 | 10/1993 |
| EP | 0 682 321 | 5/1995 |
| GB | 1 567 784 | 5/1980 |
| JP | 1-191082 | 8/1989 |
| JP | 2-36476 | 3/1990 |
| JP | 2-179794 | 7/1990 |
| JP | 3-224799 | 10/1991 |
| JP | 4-359183 | 11/1992 |
| JP | 7-200766 A | 8/1995 |
| JP | 8-7066 | 1/1996 |
| JP | 8-96090 A | 4/1996 |
| JP | 8-111573 | 4/1996 |
| JP | 8-138022 | 5/1996 |
| WO | WO 90 07858 | 7/1990 |
| WO | WO 96/07985 | 3/1996 |

OTHER PUBLICATIONS

Johnson, R.W., "Polymer Thick Films: Technology and Materials", *Circuits Manufacturing* (reprint), 4 pages (Jul. 1982).

Gilleo, K., "Using SM Devices on Flexible Circuitry", *Electri-Onics*, pp. 20-23 (Mar. 1986).

Kanatzibis, Mercouri G., "Conductive Polymers", *Chemical and Engineering News—American Chemical Society*, pp. 36-54 (Dec. 1990).

* cited by examiner

THIN, FLEXIBLE, RFID LABEL AND SYSTEM FOR USE

This application is a continuation of application Ser. No. 09/481,807 filed Jan. 11, 2000, now U.S. Pat. No. 6,741,178, which is a divisional of application Ser. No. 08/934,701 filed Sep. 22, 1997, now U.S. Pat. No. 6,013,949; which is a continuation of application Ser. No. 08/610,236 filed Mar. 4, 1996, now abandoned; which is a continuation of application Ser. No. 08/168,909, filed Dec. 17, 1993, now U.S. Pat. No. 5,497,140; which is a continuation of application Ser. No. 07/928,899 filed Aug. 12, 1992, now abandoned.

TECHNICAL FIELD

This invention relates generally to electrically powered postage stamps and mailing labels which operate to transmit radio frequency (RF) identification signals to an interrogator either at the point of shipment origin, in transit, or upon reaching a point of destination. More particularly, this invention relates to such stamps and labels having an integrated circuit therein powered by a thin flat battery cell.

RELATED APPLICATION AND BACKGROUND ART

In my co-pending application Ser. No. (71-579) entitled "Radio Frequency Identification Device and Method of Manufacture, Including an Electrical Operating System and Method", filed Jun. 17, 1992, there are disclosed and claimed new and improved radio frequency identification (RFID) tags which may be affixed to various articles (or persons) so that these articles, when shipped, may be easily tracked from the point of shipment origin, then along a given route, and then readily located upon reaching a point of destination. These RFID tags are constructed within a small area on the order of one inch (1") square or less and of a thickness on the order of 30 mils. These tags include, among other things, an integrated circuit (IC) chip having transmitter, receiver, memory and control logic sections therein which together form an IC transceiver capable of being powered by either a small battery or by a capacitor charged from a remote RF source. The IC chip including the RF transmitter and receiver sections operates to provide for the RF signal transmission and reception to and from remote sources, and a thin film antenna is also constructed within the above small area. The above novel RFID system operates to receive, store, and transmit article-identifying data to and from the memory within the IC chip. This data is stored within the IC chip memory stage and may be subsequently called up and transmitted to an interrogating party at the above point of origin, points along a given shipment route, and then upon reaching a point of destination. This co-pending application is assigned to the present assignee and is incorporated herein by reference.

The RFID device disclosed and claimed in my above identified co-pending application represents not only a fundamental breakthrough in the field of RF identification generally, but also represents significant specific advances over the prior art described in some detail in this co-pending application. This prior art includes relatively large hybrid electronic packages which have been affixed to railroad cars to reflect RF signals in order to monitor the location and movement of such cars. This prior art also includes smaller passive RFID packages which have been developed in the field of transportation and are operative for tracking automobiles. These reflective passive RFID packages operate by modulating the impedance of an antenna, but are generally inefficient in operation, require large amounts of power to operate, and have a limited data handling capability.

The above mentioned prior art still further includes bar code identification devices and optical character recognition (OCR) devices which are well known in the art. However, these bar code identification and OCR devices require labor intensive operation and tend to be not only very expensive, but highly unreliable. However, all of the above mentioned prior art devices described in my above co-pending application are only remotely related to the present invention as will become more readily apparent in the following description thereof.

SUMMARY OF INVENTION

The general purpose and principal object of the present invention is to provide still further new and useful improvements in the field of radio frequency identification (RFID) generally and improvements which are particularly adapted and well-suited for operation with electrically powered postage stamps and mailing labels. These new and useful improvements are made both with respect to the novel devices and processes described and claimed in my above identified co-pending application, and also with respect to all of the prior art described therein.

To accomplish the above purpose and object, there have been developed both an electrically powered postage stamp and an electrically powered mailing label, each of which include, in combination, an integrated circuit chip having an RF transceiver constructed therein; a thin flat battery cell connected to the IC chip for providing power thereto; and a thin film RF antenna connected to the IC chip for transmitting data to and from the IC chip. All of the above components are connected in a very thin array and mounted between opposing major facing surfaces of either a postage stamp or a larger mailing or shipping label in a substantially two dimensional planar configuration. These components are operative to store data in the IC chip memory, which data includes such things as the destination address, return address, and descriptions of the contents of the article being mailed or shipped. These components are further operative in a novel system combination to transmit the stored data to an interrogating party upon receipt of RF interrogation signals transmitted to the stamp or label, or to receive data from same.

Accordingly, it is another object of this invention to provide a new and improved RFID stamp or label of the type described which is uniquely constructed in an essentially two dimensional configuration which is easily scalable to the two dimensional major surface area of either a postage stamp or a mailing label.

Another object of this invention is to provide a new and improved electronically powered stamp or label of the type described and process for making the stamp or label which employs certain novel, thin film fabrication techniques capable of producing device thicknesses on the order of a fraction of a millimeter. These thicknesses are typically within the range of one to five mils, thereby being extremely well suited and adapted for use with corresponding postage stamp or mailing label thickness dimensions.

A further object of this invention is to provide a new and improved electronically powered postage stamp or mailing label of the type described including RFID integrated circuitry which is operatively powered by a flat and very thin battery and imparts a high and sophisticated degree of RF communication capability to these stamps or labels without significantly increasing the overall size and volume of the stamps or labels.

The above brief summary of the invention, together with its various objects, novel features and attendant advantages, will become more readily apparent in the following description of the accompanying drawings.

DETAILED DESCRIPTION OF THE PREFERRED EMBODIMENT

Figure 1:
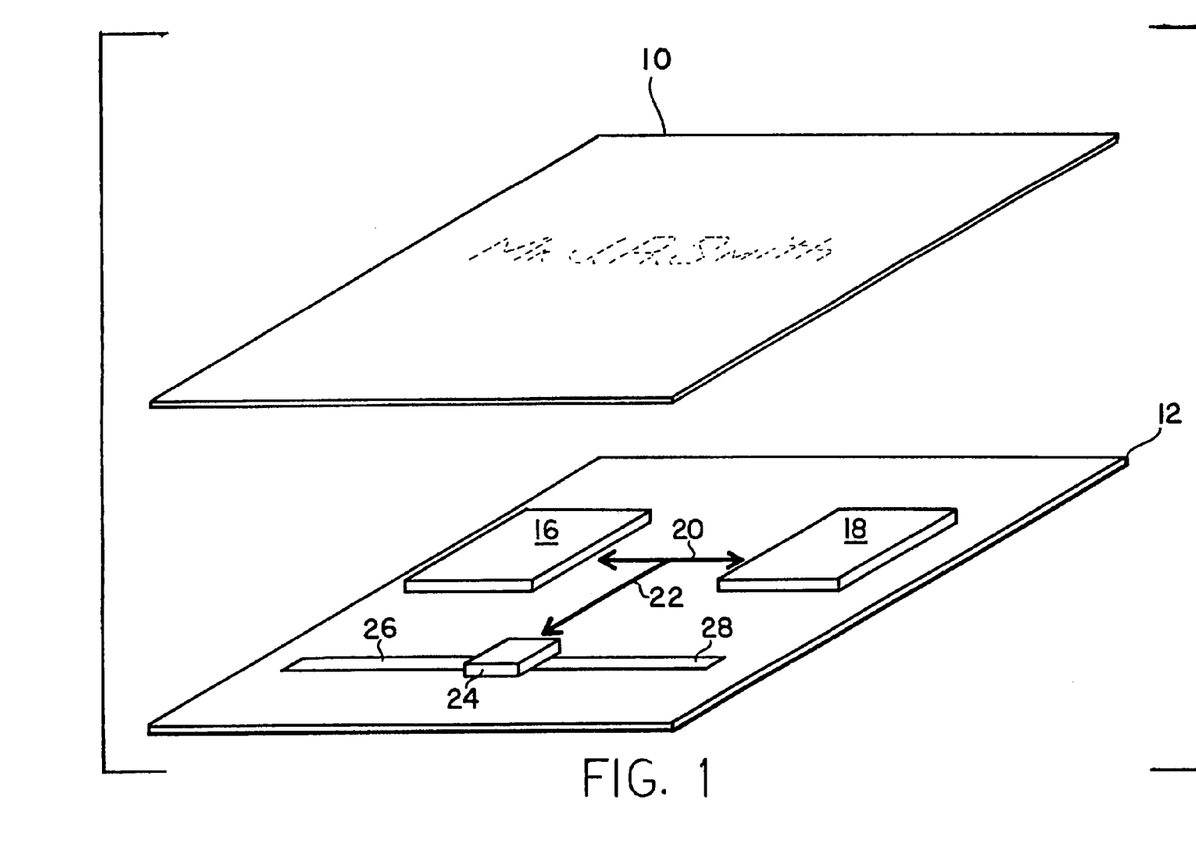
FIG. 1 is an exploded perspective view of the electrically powered mailing or shipping label embodiment of the invention, including the novel radio frequency identification system mounted on the label base member. However, it should be understood that there is no basic functional difference in the label and stamp embodiments of the invention, and that the label cover and label base members shown in FIG. 1 apply equally as well to the smaller stamp cover or stamp base members which, for sake of brevity, have not been shown in the drawings.

Referring now to FIG. 1, the electrically powered, RF operative label or stamp includes a cover member 10 and a base member 12 upon which a radio frequency identification system has been constructed using thin film deposition techniques of the type described in my above identified co-pending application Ser. No. (71-579) filed Jun. 17, 1992. Functionally speaking, the RFID system 14 will include one or more thin flat battery cells 16 and 18 which are connected in series as indicated by line 20 and are both connected via line 22 to drive an integrated circuit transceiver chip 24. The IC transceiver chip 24 will preferably be connected to a dipole antenna consisting of thin film antenna strips 26 and 28, and the dipole antenna 26 and 28 is operative to both transmit RF signals from the IC chip 24 to a controller and to receive incoming RF signals from an external RF source controller and operative to encode this data in IC chip memory in a manner more particularly described below with reference to FIG. 6. This data will typically include information on the article to which the label or stamp are affixed, such as an identification number, the sender's name, point of origin, weight, size, route, destination, and the like. In addition, the RFID system 14 may be used to automatically RF communicate with postage meters and with automatic sorting machines to thereby completely eliminate the need for human intervention for such automatic sorting, thereby greatly reducing automatic mail sorting costs while simultaneously greatly increasing the speed and accuracy of the mail sorting process.

The thin flat battery cells 16 and 18 can be made of various materials and typically include an anode, a collector, a cathode material, and a battery separator including a polymer and electrolytes of the type described below so as to not exceed a total battery thickness of 1 to 10 mils, while simultaneously being flexible and in some cases rechargeable. Furthermore, imminent commercialization of solid thin flat batteries having useful current levels at low temperatures makes the present invention commercially viable. Thus, since the IC chip 24 can also be made of thicknesses of no greater than 8 mils and since the thin film metal dipole antenna strips 26 and 28 may be held to thicknesses less than 1 to 2 mils, it is seen that the total added thickness between the label cover and base layers 10 and 12 will be negligible and not significantly affecting the bulk or the volume of the stamp or label into which the RFID system 14 is incorporated.

Figure 2:
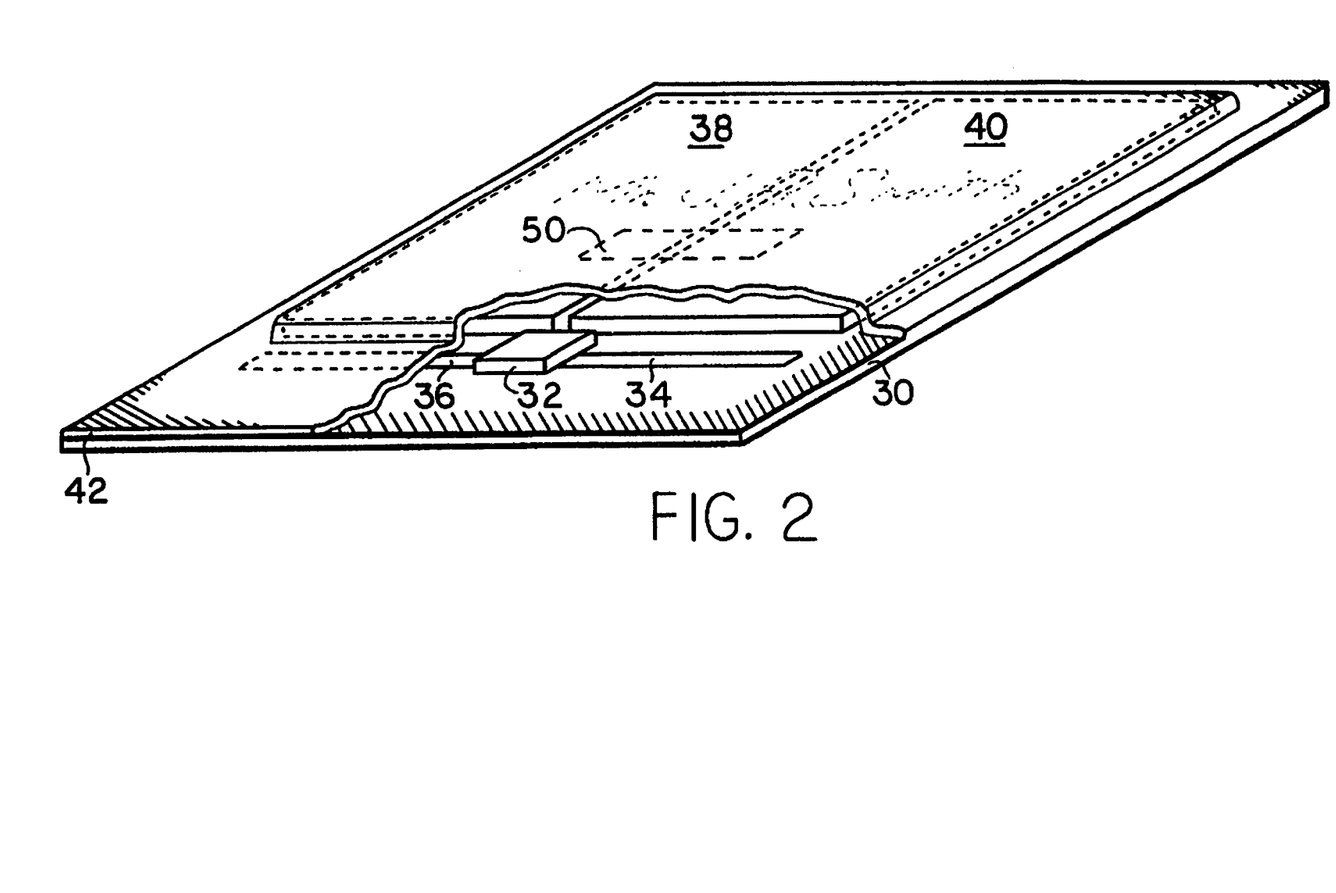
FIG. 2 is an enlarged perspective view of an RFID device and label or stamp package constructed in accordance with a preferred embodiment of the present invention.

Referring now to FIG. 2, there is shown in a perspective view a preferred device embodiment of the present invention wherein the RFID tag includes a base support layer 30 upon which an integrated circuit chip 32 is disposed on the near end of the layer 30 and connected to a dipole antenna consisting of a pair of conductive strips 34 and 36 extending laterally from the chip 32. These conductive strips 34 and 36 will typically be screen printed on the upper surface of the base support layer 30.

A pair of rectangularly shaped batteries 38 and 40 are positioned as shown adjacent to the IC chip 32 and are also disposed on the upper surface of the base support member 30. The two rectangular batteries 38 and 40 are electrically connected in series to power the IC chip 32 in a manner more particularly described below. The device or package shown in FIG. 2 is then completed by the folding over of an outer or upper cover member 42 which is sealed to the exposed edge surface portions of the base member 30 to thereby provide an hermetically sealed and completed package. When the cover member 42 is folded over on the base member, the contact 50 which is attached to batteries 38 and 40 using conductive epoxy, provides the back side series electrical connection for the two batteries 38 and 40. The integrated circuit chip 32 has transmitter, memory, control, logic, and receiver stages therein and is powered by the two batteries 38 and 40 during the transmission and reception of data to and from an interrogator to provide the interrogator with the various above information and identification parameters concerning the article, animal or person to which the RFID tag is attached.

Figure 3:
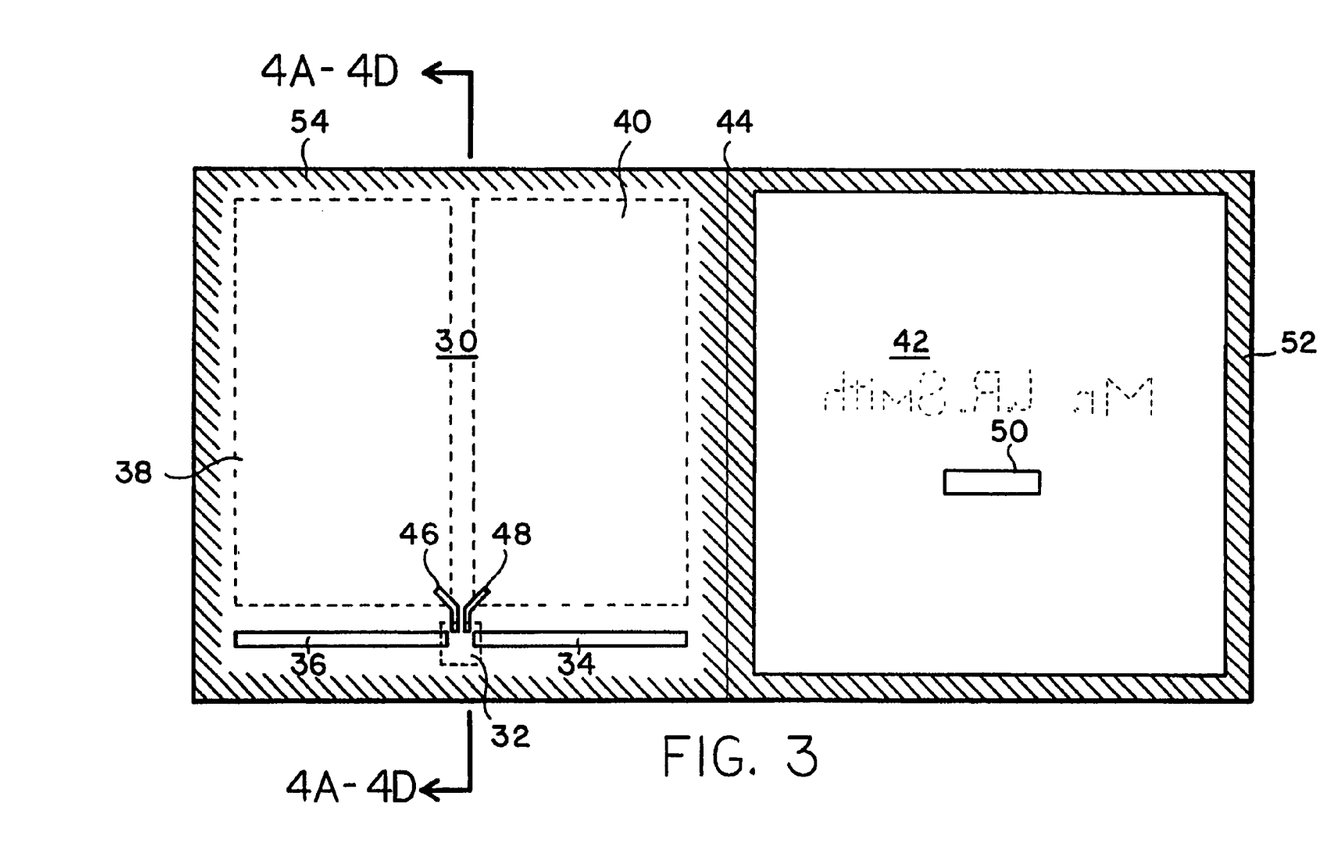
FIG. 3 is a plan view showing the conductive patterns on the base and cover members used in FIG. 2, including dotted line outlines for the locations of the IC chip and batteries which form the FIG. 2 structure.

Referring now to FIG. 3, there is shown a plan view of the geometry of the base support member 30 and the cover member 42 which, during the initial manufacturing stage for the RFID device, are joined at an intersecting line 44. The dipole antenna strips 34 and 36 are shown positioned on each side of the IC chip 32, and the two conductive strips 46 and 48 serve to connect the tops of the batteries 38 and 40 into the IC chip 32. A conductive strip 50 is provided on the upwardly facing inside surface of the top cover 42, so that when the cover 42 is folded by 180.degree. at intersecting line 44, its outer boundary 52 is ready to be sealed with the outer boundary 54 of the base support member 30. Simultaneously, the conductive strip 50 bonded by the conductive epoxy to the batteries 38 and 40, completes the series electrical connection used to connect the two batteries 38 and 40 in series with each other and further in the series circuit with the integrated circuit chip 32 through the two conductors 46 and 48.

Figure 4A:
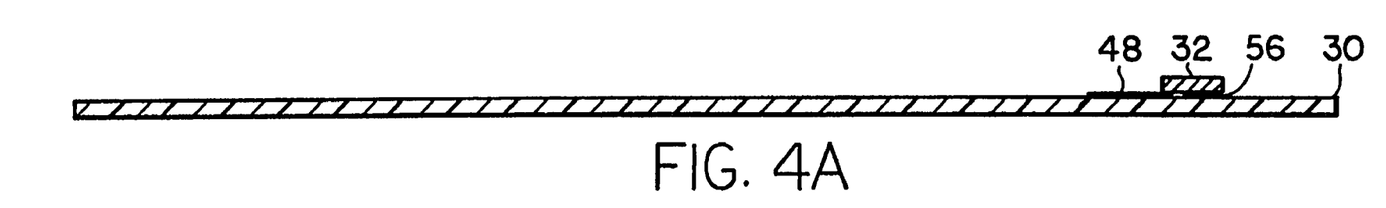
FIGS. 4A through 4D are cross sectional views taken along lines 4—4 of FIG. 3 showing the four (4) major processing steps which are used in constructing the RFID device and system array in accordance with a preferred process embodiment of the invention.

Referring now to FIGS. 4A through 4D taken at the 4A–4D cross section indicated in FIG. 3, FIG. 4A shows in cross section view the IC chip 32 bonded to the base support member 30 by means of a spot or button of conductive epoxy material 56. The conductive strip 48 is shown in cross section on the upper surface of the base support member 30.

Figures 4B, 4C:
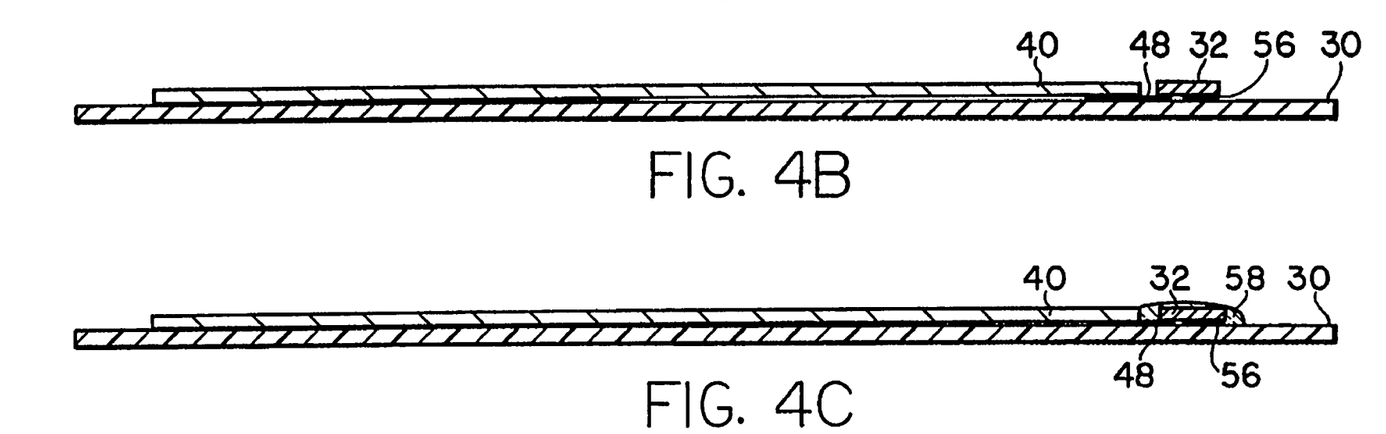

Referring now to FIG. 4B, the battery 40 is aligned in place as indicated earlier in FIG. 2 and has the right hand end thereof bonded and connected to the upper surface of the conductive strip 48 by means of a spot of conductive epoxy applied to the upper surface of the conductive strip 48, but not numbered in this figure.

Referring now to FIG. 4C, a stiffener material 58 is applied as shown over the upper and side surfaces of the IC chip 32, and the stiffener material will preferably be an insulating material such as "glob-top" epoxy to provide a desired degree of stiffness to the package and protection for the integrated circuit as completed.

Figure 4D:
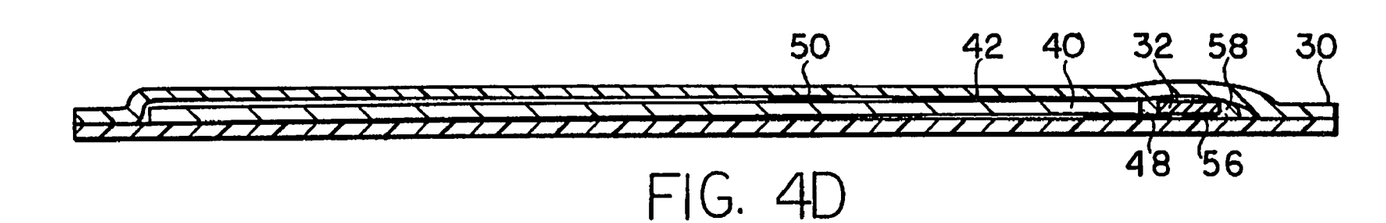

Next, a spot of conductive epoxy is applied to each end of the conductive strip 50, and then the cover layer material 42 with the conductive epoxy thereon is folded over onto the batteries 38 (of FIG. 2) and 40 and the base member 30 to cure and heat seal and thus complete and seal the package in the configuration shown in FIG. 4D. This figure corresponds to the remaining stations 22, 24, and 26 in FIG. 1.

Figure 5:
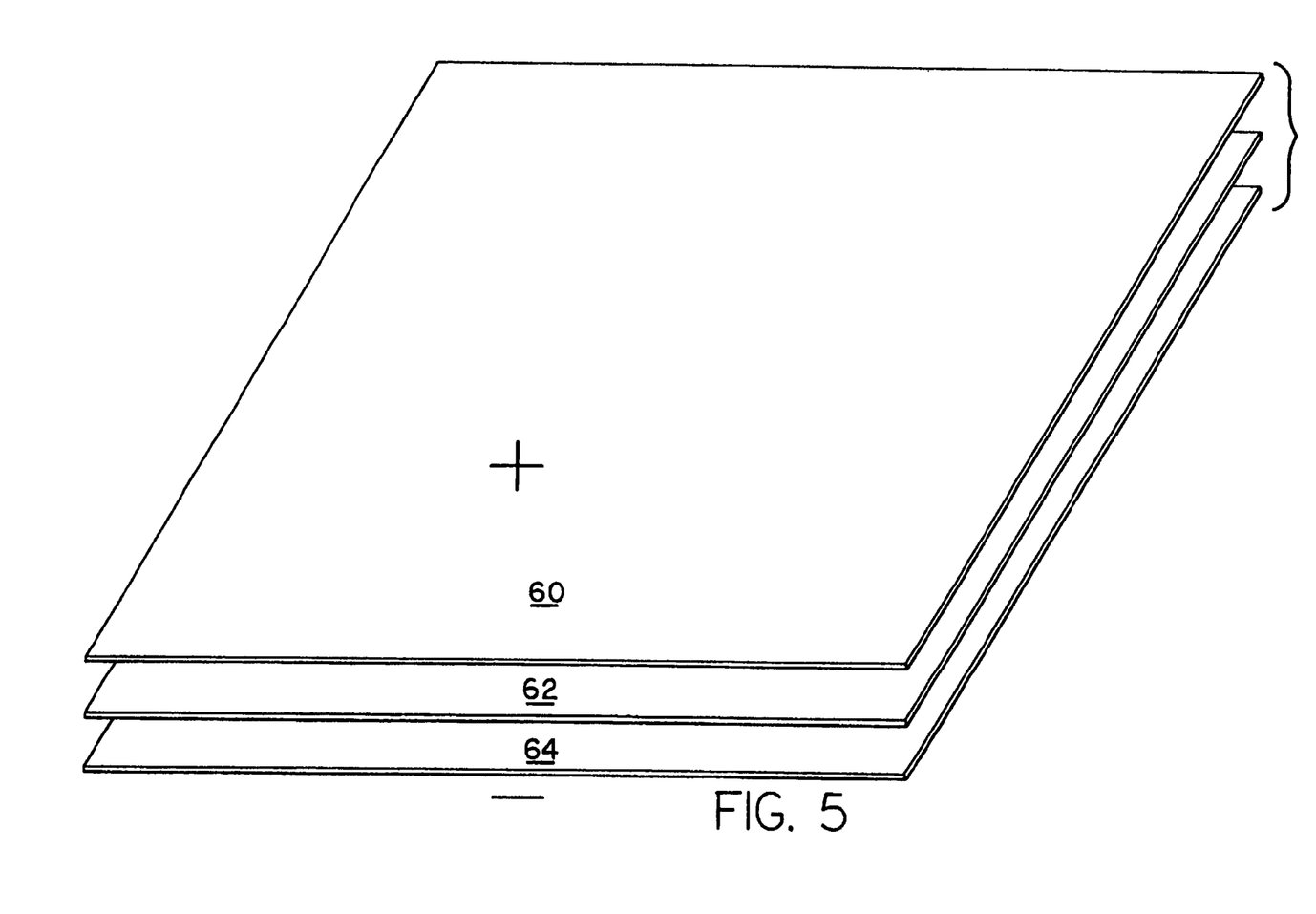
FIG. 5 is a greatly enlarged perspective view of one suitable, very thin lithium/vanadium-oxide/copper battery or cell useful in the label and stamp embodiments and perspective views shown in FIGS. 1 and 2 above.

Referring now to FIG. 5, there is shown in a greatly enlarged perspective view a lithium/vanadium-oxide/copper battery including a lithium anode 60 as a top plate for the battery, an intermediate polymerized vanadium oxide electrolyte and separator layer 62 and a copper collector 64. However, the layer 62 is not limited to the use of vanadium oxide ($V_2O_5$ or $V_6O_{13}$), but may use other oxides such as magnesium oxide, $MnO_2$. The intermediate layer 62 is formed and polymerized on the upper surface of the copper collector 64 and may be obtained from outside manufacturers or vendors as a one piece sheet (62, 64) and then assembled in house with lithium top anode sheets. Alternatively, the thin flat battery structure shown in FIG. 5 may be obtained as a completed battery cell from outside vendors or manufacturers. The thickness of these thin flat batteries will typically be in the range of 1 to 10 mils, and as previously indicated may be made as thin as a fraction of a mil. The components are assembled in an argon or other inert dry atmosphere using state of the art thin dry cell fabrication techniques. The use of conductive polymer layers as separators in thin flat battery cells is generally known in the art and is described, for example, in an article by M. G. Kanatzibis entitled "Conductive Polymers", Chemical and Engineering News—American Chemical Society, Dec. 3, 1990, incorporated herein by reference.

Figure 6:
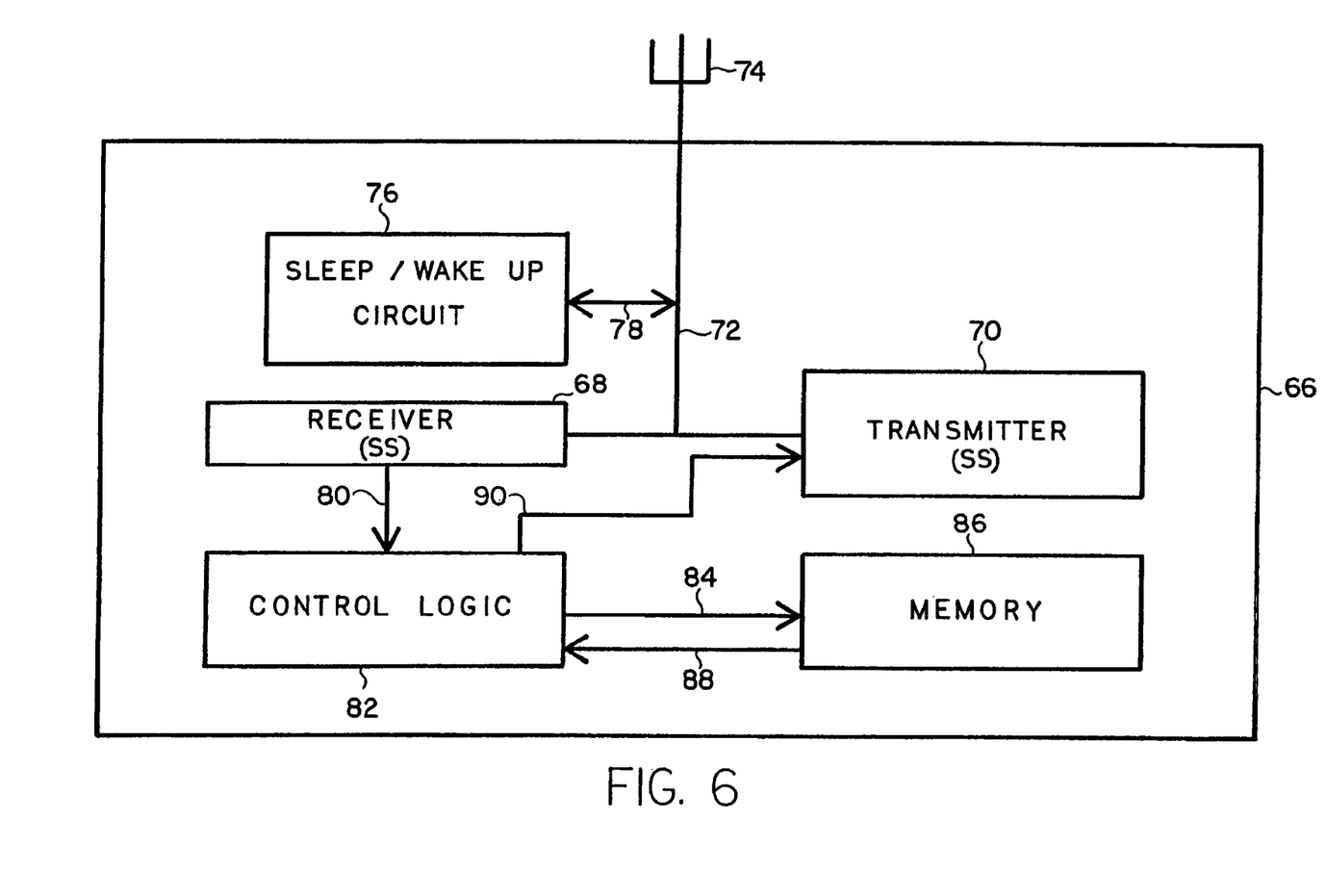
FIG. 6 is a functional block diagram showing the major signal processing stages within the RFID integrated circuit chip described herein and shown in FIGS. 1 and 2 above. These major signal processing stages are also used within the interrogation unit (not shown) which is operative to interrogate the IC chip shown in FIGS. 1 and 2 above.

Referring now to FIG. 6, the rectangular outer boundary 66 in this figure defines the active area on the integrated circuit chip (e.g. 24 in FIG. 1) in which the novel integrated circuit transceiver has been formed using state of the art MOS planar processing techniques. These MOS planar processing techniques are well known in the art and are, therefore, not described in detail herein. Within the chip active area 66 there is provided an RF receiver stage 68 and an RF transmitter stage 70, both connected through a common line or connection 72 to an off-chip antenna 74 of any planar type. A sleep/wake up circuit 76 is also connected via line 78 to the antenna 74 and operates in response to signals received from the antenna 74 to activate the necessary remaining circuitry and stages on the IC chip 66 described below.

The receiver 68 is connected through a line 80 to a control logic stage 82, and a first output line 84 from the control logic stage 82 is connected as an input to the memory stage 86. A return output line 88 from the memory stage 86 connects back to the control logic stage 82, and a second output line 90 from the control logic stage 82 connects as a second input to the transmitter 70 for providing memory or stored input data to the transmitter 70 via the control logic stage 82. In a data encoding operation, the data received concerning ID number, name, route, destination, size, weight, etc. is processed through the receiver 68 and through the control logic stage 82 and encoded into the memory stage 86.

As an example of a data call-up operation, when the RFID package in the above figures is placed on the outside surface of a piece luggage by the airlines or on a package for shipment by the postal service, either the airline agent or the postal worker will transmit information to the receiver 68 via an RF communication link concerning data such as the owner's name ID number, point of origin, weight, size, route, destination, and the like. This information received at the receiver stage 68 is then transmitted over line 80 and through the appropriate control logic stage 82 which sorts this information out in a known manner and in turn transmits the data to be stored via lines 84 into a bank of memory 86. This data is stored here in memory 86 until such time that it is desired to call up the data at one or more points along the shipment route.

For example, upon reaching a point of shipment destination, an interrogator may want to call up this data and use it at the point of destination for insuring that the item of shipment or luggage is most ensuredly and efficiently put in the hands of the desired recipient at the earliest possible time. Thus, an interrogator at the destination point will send interrogation signals to the RFID chip 66 where they will be received at the antenna 74 and first processed by a sleep/wake up circuit 76 which operates to bring the FIG. 6 circuitry out of the sleep mode and allow the receiver stage 68 to process this received data to the control logic stage 82 via line 80. At the same time, the requestor will be operating an interrogation electronic unit having therein the same circuitry as that shown in FIG. 6, less the sleep/wake up circuit 76.

With all stages in the FIG. 6 circuitry now awake, the memory stage 86 will produce the above six pieces of information relating to the shipped article and generate this data on line 88 and back through the control logic stage 82 into the transmitter 70 so that the transmitter 70 can now transmit this data to the interrogator.

The receiver and transmitter sections 68 and 70 in FIG. 6 will preferably be operated in one of the well known spread spectrum (SS) modes using one of several available SS types of modulation which include: (1) direct sequence, (2) frequency hopping, (3) pulsed FM or chirped modulation, (4) time hopping, or time-frequency hopping used with pulse amplitude modulation, simple pulsed amplitude modulation or binary phase shift keying. The spread spectrum mode of operation per se is generally well known in the art and must conform to the frequency band separation requirements of the FCC Regulations, Part 15, incorporated herein by reference. The circuitry for the interrogation unit (not shown) will be similar to the functional system shown in FIG. 6 as will be understood by those skilled in the art, and therefore the interrogation unit will not be described herein.

Various modifications may be made in and to the above described embodiment without departing from the spirit and scope of this invention. For example, various modifications and changes may be made in the antenna configurations, battery arrangements (such as battery stacking), device materials, device fabrication steps, and the system block diagram in FIG. 6 without departing from the scope of this invention. In addition, the various off chip components such as the antenna, battery, capacitor, and even inductors can be manufactured on-chip within the claims herein. In the case where RF charging is used, a battery will not be required. Accordingly, these and other constructional modifications are within the scope of the following appended claims.

In addition, still other modifications may be made in and to the above described cell fabrication and device fabrication procedures without departing from the spirit and scope of this invention. For example, the present invention is not limited to the use of any particular types of thin flat battery cells or materials or cell fabrication processes, nor is it limited to the particular preferred fabrication technique for the RFID system as shown in FIGS. 2, 3, and 4 above. Moreover, the present invention is not strictly limited to the use of radio frequency communication and may, in environments where RF signals are not allowed, be modified so that the IC chip transceiver is capable of communicating with light waves using certain state of the art electro-optical coupling techniques which are not described herein, but are clearly within the scope of the following appended claims.

Finally, it will be understood and appreciated by those skilled in the art that the present invention also includes forming an optical detector on the IC chip as a means of receiving and detecting signals carried by light and also as a means of powering the RFID transceiver as an alternative to using a battery. Accordingly, these and other systems and constructional modifications are clearly within the scope of the broad claims filed herein.

I claim:

1. A radio frequency identification (RFID) label comprising:
   a first flexible material layer having substantially uniform thickness;
   a single integrated circuit (IC) comprising memory configured to store an identification number and a transceiver configured to receive an interrogation signal and to provide the identification number in response to the interrogation signal;
   an antenna coupled to the IC; and
   a second flexible material layer having substantially uniform thickness coupled directly to the first layer in at least a portion of a region surrounding the IC and the antenna to form a flexible enclosure, wherein the IC and the antenna are disposed between the first and second layers.

2. The RFID label of claim 1, wherein the first layer comprises an adhesive to affix the label to a surface of an article.

3. The RFID label of claim 2, wherein the second layer comprises text printed on a surface of the second layer.

4. The RFID label of claim 3, wherein the antenna is a dipole antenna formed on the first layer.

5. The RFID label of claim 4, wherein the antenna comprises a printed conductive material.

6. The RFID label of claim 4, wherein the IC includes circuitry disposed on a surface of the IC facing the first layer.

7. The RFID label of claim 4, wherein a distance between opposing surfaces of the first and second layers is less than 10 mils throughout the enclosure.

8. The RFID label of claim 4, wherein a thickness of at least a portion of the label is within a range of one to five mils.

9. The RFID label of claim 4, wherein the interrogation signal is a spread spectrum signal.

10. The RFID label of claim 4, further comprising a stiffener material disposed between the IC and the second layer.

11. The RFID label of claim 1, further comprising a first battery disposed between the first and second layers, the first battery being flexible and rectangular.

12. The RFID label of claim 11, further comprising a second battery coupled in series with the first battery and disposed between the first and second layers, the second battery being flexible and rectangular.

13. The RFID label of claim 11, wherein the first battery is rechargeable.

14. The RFID label of claim 11, wherein the IC further comprises a sleep/wake-up circuit to bring the IC out of a sleep mode.

15. The RFID label of claim 1, wherein the flexible enclosure is hermetically sealed.

16. A radio frequency identification (RFID) label comprising:
    a first flexible film having substantially uniform thickness;
    a dipole antenna formed on the first film;
    a single integrated circuit (IC) coupled to the antenna and comprising memory configured to store an identification number and a transceiver configured to receive a spread spectrum interrogation signal and to provide the identification number in response to the signal; and
    a second flexible film having substantially uniform thickness sealed directly to the first film along at least a portion of a boundary that surrounds the IC and the antenna to form a flexible package, wherein the IC and the antenna are disposed between opposing surfaces of the first and second films in a substantially two dimensional planar configuration.

17. The RFID label of claim 16, wherein the second film comprises text printed on a surface of the second film.

18. The RFID label of claim 16, wherein the first film comprises an adhesive to affix the device to an article to track the article.

19. The RFID label of claim 16, wherein the antenna comprises a printed conductive material.

20. The RFID label of claim 16, wherein the IC includes circuitry disposed on a surface of the IC facing the first film.

21. The RFID label of claim 16, wherein a distance between the opposing surfaces is less than 10 mils throughout the package.

22. The RFID label of claim 21, wherein a thickness of at least a portion of the label is within a range of one to five mils.

23. The RFID label of claim 16, further comprising a stiffener material disposed between the IC and the second film.

24. The RFID label of claim 16, wherein the first film is transparent.

25. The RFID label of claim 16, wherein the second film is sealed directly to the first film along an entire boundary that surrounds the IC and the antenna.

26. The RFID label of claim 25, wherein the package is hermetically sealed.

27. The RFID label of claim 25, wherein the boundary is an outer boundary.

28. A radio frequency identification (RFID) device comprising:
- a first flexible film having substantially uniform thickness;
- a dipole antenna formed on the first film;
- a single integrated circuit (IC) coupled to the antenna and comprising memory configured to store an identification number and a transceiver configured to receive an interrogation signal and to provide the identification number in response to the signal; and
- a second flexible film having substantially uniform thickness sealed directly to the first film at least along an outer boundary of the first film to form a flexible label that includes the IC and the antenna.

29. The RFID device of claim 28, wherein the second film comprises text printed on a surface of the second film.

30. The RFID device of claim 29, wherein the first film comprises an adhesive to affix the device to a surface of an article.

31. The RFID device of claim 29, wherein the antenna comprises a printed conductive material.

32. The RFID device of claim 29, wherein the IC includes circuitry disposed on a surface of the IC facing the first film.

33. The RFID device of claim 28, wherein the interrogation signal is a spread spectrum signal.

34. The RFID device of claim 28, wherein the IC and the antenna are disposed between opposing surfaces of the first and second films.

35. The RFID device of claim 34, wherein the outer boundary surrounds the IC and antenna.

36. A radio frequency identification (RFID) device comprising:
- a first flexible material layer having substantially uniform thickness and a boundary region;
- a dipole antenna formed on the first layer;
- a single integrated circuit (IC) coupled to the antenna and comprising memory and a transceiver configured to receive an interrogation signal and to provide a response; and
- a second flexible material layer having substantially uniform thickness and comprising text printed on a first surface of the second layer, wherein a second surface of the second layer is coupled directly to at least the boundary region of the first layer to form a flexible label that includes the IC and the antenna, and wherein the IC and the antenna are disposed in a substantially two dimensional planar configuration.

37. The RFID device of claim 36, wherein the first layer comprises an adhesive to affix the device to an article to track the article.

38. The RFID device of claim 36, wherein the IC includes circuitry disposed on a surface of the IC facing the first layer.

39. The RFID device of claim 38, wherein the boundary region is an outer boundary, the outer boundary surrounds the IC and antenna, and the IC and the antenna are disposed between opposing surfaces of the first and second layers.

40. The RFID device of claim 36, wherein the first layer and second layer comprise the same material.

41. The RFID device of claim 40, wherein a single sheet of the material is folded over to form the first layer and the second layer.

42. The RFID device of claim 36, wherein a distance between opposing surfaces of the first and second layers is less than 10 mils throughout the device.

43. The RFID device of claim 36, wherein a thickness of at least a portion of the device is within a range of one to five mils.

44. The RFID device of claim 36, further comprising a stiffener material disposed between the IC and the second surface of the second layer.

45. The RFID device of claim 36, wherein the interrogation signal is a spread spectrum signal.

46. A system, comprising:
- an article;
- a radio frequency identification (RFID) device affixed to the article, the RFID device including a dipole antenna, a single integrated circuit (IC) storing an identification number that identifies the article, and two flexible films, each of substantially uniform thickness, sealed directly together along at least a boundary to form a flexible label that includes the IC and the antenna; and
- an interrogator configured to charge and interrogate the RFID device to determine the identification number in accordance with tracking the article.

47. The system of claim 46, wherein the RFID device comprises an adhesive to affix the device to the article.

48. The system of claim 46, wherein the RFID device comprises text printed on a surface of the RFID device.

49. The system of claim 48, wherein the IC includes circuitry disposed on a surface of the IC facing the antenna.

50. The system of claim 49, wherein the boundary surrounds the IC and antenna, and the IC and the antenna are disposed between opposing surfaces of the two films.

51. The system of claim 50, wherein a distance between opposing surfaces of the two films is less than 10 mils throughout the RFID device.

52. The system of claim 51, wherein a thickness of at least a portion of the RFID device is within a range of one to five mils.

53. The system of claim 46, wherein the RFID device further comprises a stiffener material disposed over the IC of the RFID device.

54. The system of claim 46, wherein the interrogator is configured to interrogate the RFID device using a spread spectrum signal.

55. A system, comprising:
- a plurality of articles;
- a plurality of radio frequency identification (RFID) devices, each RFID device attached to a respective article and including a dipole antenna, a single integrated circuit (IC) storing an identification number that identifies the respective article, and two flexible films, each of substantially uniform thickness, sealed directly together along at least a boundary to form a flexible label that includes the IC and the antenna disposed in a substantially two dimensional planar configuration; and
- an interrogator configured to charge and interrogate, using spread spectrum signals, the plurality of RFID devices to determine each identification number that identifies each respective article in accordance with tracking the plurality of articles.

56. The system of claim 55, wherein each RFID device comprises a respective adhesive layer that attaches the respective RFID device to the respective article.

57. The system of claim 56, wherein each RFID device comprises respective text printed on a respective surface of the RFID device.

58. A system, comprising:
- first and second articles;
- a first radio frequency identification (RFID) device affixed to the first article, the first RFID device including a first dipole antenna, a first single integrated circuit (IC) storing a first identification number that identifies the first article, and two first flexible films, each of substantially uniform thickness, sealed directly together along at least a first boundary to form a flexible label that includes the first IC and the first antenna, wherein the first IC and the first antenna are disposed in a substantially two dimensional planar configuration;

a second radio frequency identification (RFID) device affixed to the second article, the second RFID device including a second dipole antenna, a second single integrated circuit (IC) storing a second identification number that identifies the second article, and two second flexible films, each of substantially uniform thickness, sealed directly together along at least a second boundary to form a flexible label that includes the second IC and the second antenna, wherein the second IC and the second antenna are disposed in a substantially two dimensional planar configuration; and an interrogator configured to charge and interrogate, using spread spectrum signals, the first and second RFID devices to determine the first and second identification numbers that identify the first and second articles, respectively, in accordance with a process of tracking the first and second articles.

59. The system of claim 58, wherein the first and second boundaries of the first and second RFID devices, respectively, surround the respective IC and antenna, and the respective IC and antenna are disposed between respective opposing surfaces of the respective two films.

60. The system of claim 58, wherein stiffener material is disposed over the first and second ICs.

61. A system, comprising:
an article;
a radio frequency identification (RFID) device affixed to the article, the RFID device including a dipole antenna formed on a first flexible film of substantially uniform thickness and having a boundary, a single integrated circuit (IC) storing an identification number that identifies the article, and a second flexible film of substantially uniform thickness and comprising printed text sealed directly to the first film along the boundary to form a flexible label that includes the IC and the antenna; and
a plurality of interrogators, each configured to charge and interrogate the RFID device using spread spectrum signals to determine the identification number in accordance with tracking the article.

62. The system of claim 61, wherein the plurality of interrogators includes at least three interrogators, a first interrogator at a point of origin, a second interrogator at a point along a shipment route, and a third interrogator at a point of destination of the article.

63. The system of claim 61, wherein the first film of the RFID device comprises an adhesive to affix the RFID device to the article.

64. The system of claim 61, wherein the IC includes circuitry disposed on a surface of the IC facing the first film.

65. The system of claim 61, wherein the IC and the antenna are disposed between opposing surfaces of the first and second films.

66. The system of claim 65, wherein the boundary surrounds the IC and antenna.

67. The system of claim 61, wherein the RFID device further comprises a stiffener material disposed over the IC of the RFID device.

68. A system, comprising:
an article;
a radio frequency identification (RFID) device attached to the article, the RFID device including a dipole antenna, a single integrated circuit (IC) comprising memory and a transceiver, and two flexible films, each of substantially uniform thickness, sealed directly together along a region to form a flexible label that includes the IC and the antenna, wherein the IC and the antenna are disposed in a substantially two dimensional planar configuration;
a first interrogator configured to charge the RFID device and store an identification number that identifies the article in the memory of the RFID device using spread spectrum; and
a second interrogator configured to charge the RFID device and read the identification number stored in the RFID device using spread spectrum in accordance with tracking the article.

69. The system of claim 68, wherein the IC includes circuitry disposed on a surface of the IC facing the antenna.

70. The system of claim 69, wherein the region is a boundary surrounding the IC and antenna, and the IC and the antenna are disposed between opposing surfaces of the two films.

71. The system of claim 68, wherein the region is a boundary surrounding the IC and antenna, and the IC and the antenna are disposed between opposing surfaces of the two films.

72. The system of claim 68, wherein the RFID device comprises an adhesive to affix the device to the article.

73. The system of claim 69, wherein the RFID device comprises an adhesive to affix the device to the article.

74. The system of claim 68, wherein the RFID device further comprises a stiffener material disposed over the IC of the RFID device.

75. The system of claim 69, wherein the RFID device further comprises a stiffener material disposed over the IC of the RFID device.

* * * * *